US008107630B2

(12) United States Patent
Oh et al.

(10) Patent No.: US 8,107,630 B2
(45) Date of Patent: Jan. 31, 2012

(54) APPARATUS AND METHOD FOR MANAGING STATIONS ASSOCIATED WITH WPA-PSK WIRELESS NETWORK

(75) Inventors: Seung-jae Oh, Seoul (KR); Se-hee Han, Seoul (KR); Joo-yeol Lee, Seoul (KR); Dong-shin Jung, Suwon-si (KR); Won-seok Kwon, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1323 days.

(21) Appl. No.: 11/736,101

(22) Filed: Apr. 17, 2007

(65) Prior Publication Data
US 2008/0044024 A1 Feb. 21, 2008

(30) Foreign Application Priority Data
Aug. 9, 2006 (KR) .................. 10-2006-0075304

(51) Int. Cl.
H04L 9/08 (2006.01)
(52) U.S. Cl. ..................... 380/278; 713/171
(58) Field of Classification Search .............. 713/171; 380/278
See application file for complete search history.

(56) References Cited

U.S. PATENT DOCUMENTS
7,249,374 B1 * 7/2007 Lear et al. ........................ 726/6
2007/0280481 A1 * 12/2007 Eastlake et al. ............... 380/277

OTHER PUBLICATIONS

Asokan N, et al. "Visitor Access Management in Personal Wireless Networks." Dec. 2005. pp. 686-694.*
Sung-Min Lee, et al. "Guest Access: Change Even Your Mother into an Effective Secuirty Technician." pp. 442-447. Jan. 2006.*
Anonymous. "Windows Connect Now-Net." Windows Rally Specification. pp. 51-60, May 2006.*
Asokan N, et al.; "Visitor Access Management in Personal Wireless Networks"; Multimedia, Seventh IEEE International Symposium on Irvine, CA, USA Dec. 12-14, 2005; Piscataway, NJ, USA, IEE, Dec. 12, 2005, pp. 686-694, XP010870603 ISBN:0-7695-2489-3; sections 3.1 and 3.2 *figures 1-3*.
Sung-Min Lee, et al.;"Guest Access: Change Even Your Mother into an Effective Security Technician"; Consumer Communications and Networking Conference, 2006. CCNC 2006, 2006 3rd IEEE Las Vegas, NV, USA Jan. 8-10, 2006, Piscataway, NJ, USA, IEEE, Jan. 8, 2006, pp. 442-447, XP010893247; ISBN:1-4244-0085-6; Sections 2.2 and 3 *figure 2*.
Anonymous;"Windows Connect Now-NET" Windows Rally Specification, [Online], XP002460510; Retrieved from Internet: URL:http://web.archive.org/web/20060622150425/http://download.microsoft.com/download/a/f/7/af7777e5-7dcd-4800-8a0a-b18336565f5b/WCN-Netspec.doc>; *pp. 5-8* May 2006.

* cited by examiner

Primary Examiner — Jason Gee
(74) Attorney, Agent, or Firm — Sughrue Mion, PLLC

(57) ABSTRACT

Provided are a method and apparatus for managing a station by providing an encrypted key to the station in a wireless network under a Wi-Fi Protected Pre-Shared Key (WPA-PSK) environment. In the method, a registrar determines whether a new station is a guest station, based on user input. If the new station is a guest station, the registrar includes a session key (and not a shared key) into an $M_8$ message according to a Wi-Fi Alliance (WFA) Simple Config protocol and transmits the $M_8$ message to the station. Accordingly, it is possible to permit a guest station to temporarily access the network without a user's management of information regarding the guest station.

3 Claims, 5 Drawing Sheets

APPARATUS AND METHOD FOR MANAGING STATIONS ASSOCIATED WITH WPA-PSK WIRELESS NETWORK

CROSS-REFERENCE TO RELATED PATENT APPLICATION

This application claims priority from Korean Patent Application No. 10-2006-0075304, filed on Aug. 9, 2006, in the Korean Intellectual Property Office, the disclosure of which is incorporated herein in its entirety by reference.

BACKGROUND OF THE INVENTION

1. Field of the Invention

The present invention relates to a wireless network under a Wi-Fi Protected Access Pre-Shared Key (WPA-PSK) environment, and more particularly, to a method and apparatus for managing a station by providing an encrypted key to the station in a wireless network under a WPA-PSK environment.

2. Description of the Related Art

A security level for communications in a wireless network is lower than in a wired network, since a route of data transmission in the wireless network is not physically fixed unlike in the wired network. Thus, most of radio communication protocols support encryption of data packets to be transmitted in order to securely establish a wireless communication. In particular, a WPA-PSK scheme used in a radio local area network (LAN) allows only stations that share the same encryption key with an access point to access a network and establish a communication with the access point.

FIG. 1 is a timing diagram illustrating a process of producing a session key in a WPA-PSK network. In the WPA-PSK network, an access point and stations share a Pre-Shared Key (PSK). The PSK is used to generate a session key for encrypting and decrypting messages that are exchanged between the access point and each of the stations.

In operation 110, the access point and a station go through a predetermined authentication process and a predetermined association process. For this authentication and association, an open authentication method defined in the IEEE 802.11 standard may be used.

In operation 120, the access point that went through the authentication process and the association process, produces a first random number. In operation 125, the station that went through the authentication process and the association process, produces a second random number. In operations 130 and 140, the access point and the station exchange the first and the second random numbers. In this case, a message that contains the first random number and a message that contains the second random number respectively contain a medium access control (MAC) address of the access point and a MAC address of the station. Accordingly, the access point and the station can share the first and the second random numbers, the MAC address of the access point, and the MAC address of the station.

In operations 150 and 155, each of the access point and the station produces a session key according to the same algorithm. For generation of the session key, a PSK is further required, in addition to the first and the second random numbers, the MAC address of the access point, and the MAC address of the station, which are already shared by the access point and the station. That is, the station must have the same PSK as that of the access point in order to produce the same session key as that of the access point, that is, in order to establish a communication with the access point. Thus, a user must manage in order for the station and the access point to store the same PSK.

In order to improve such an inconvenience, the Wi-Fi Alliance (WFA) has proposed a Simple Config protocol, whereby a registrar allows a station to go through an authentication process so as to achieve the same PSK as that of an access point without a user's intervention. The Simple Config protocol is specified in the Windows Connect Now (WCN)-NET Specifications.

FIG. 2 is a timing diagram illustrating a process of allowing a station to access the WPA-PSK network. In operation 201, the station transmits a probe request message to an access point, and the access point transmits a probe response message to the station in response to the probe request message. If the access point supports the Simple Config protocol, the access point includes information indicating that it supports the Simple Config protocol into the probe response message. The station that supports the Simple Config protocol determines as to whether the Simple Config protocol is to be continued, based on the probe response message.

If the station detects the access point, which is to be accessed, through exchange of the probe request message and the probe response message, in operations 202 and 203, the station performs an authentication process and an association process that are defined in the IEEE 802.11 standard, respectively, so as to be associated with the access point. Although being associated with the access point by performing operation 203, the station cannot produce a Pairwise Transient Key (PTK), which is a session key, without a PSK, and thus cannot normally exchange data in the WPA-PSK network. A process of producing a session key by using a shared key, which is described above with reference to FIG. 1, is referred to as 4-way handshaking.

In operation 204, the station and the access point exchange messages according to the WFA Simple Config protocol so as to share the same PSK. In this case, a registrar is used to exchange messages with the station in the WFA Simple Config protocol. The registrar, which is an entity that provides the station with access information for allowing the station to access a wireless network, may be included in the access point or be embodied as a device separately from the access point. In FIG. 2, it is assumed that the registrar is included in the access point.

In operation 205, the station and the access point that obtain the same PSK in operation 204 perform 4-way handshaking in order to produce the same PTK. In operation 206, the station and the access point establish a data communication by using the produced PTK.

FIG. 3 illustrates a process in which a station and an access point establish a communication according to a WFA Simple Config protocol. That is, FIG. 3 illustrates operation 204 of the process, illustrated in FIG. 2, in greater detail.

Referring to FIG. 3, the station exchanges 8 messages with a registrar by using the Simple Config protocol and without a PSK. The station (an enrollee illustrated in FIG. 3) and the registrar produce an encryption key, which is to be used in messages exchanged between the station and the access point, according to a Diffie-Hellman key exchange method. The registrar encrypts wireless network access information including the PSK by using the encryption key, and transmits the encrypted result to the station.

More specifically, referring to FIG. 3, the Diffie-Hellman key exchange method allows generation of a key for producing an AuthKey and a KeywrapKey. For this end, the station and the registrar exchange a PKE and a PKR, which are their Diffie-Hellman public keys, by using $M_1$ and $M_2$ messages, and produce a Key Derivation Key (KDK, which is named since it is used to derive the AuthKey and the KeywrapKey), which is the result of performing the Diffie-Hellman key exchange method, by using the PKE and PKR.

That is, the registrar that has already possessed the PKR obtains the PKE by receiving the $M_1$ message, and thus, can produce the KDK by using the PKR and the PKE, and the AuthKey and the KeywrapKey by using the KDK. Also, the registrar produces an HMAC (message authentication code) by using the AuthKey, adds the $M_2$ message into the produced HMAC, and transmits the HMAC to the station.

The station receives the $M_2$ message, produces the Auth-Key and the KeywrapKey, and verifies a HMAC part of the $M_1$ message by using the AuthKey. HMAC parts of the $M_2$ through $M_8$ messages indicate addition of code for verifying whether a message is altered by a third party. As a result, the station and the registrar obtain the same AuthKey and the KeywapKey by exchanging the $M_1$ and $M_2$ messages.

Then, the station and the registrar are capable of determining whether they have the same password by exchanging E-Hash1, E-Hash2, R-Hash1, and R-Hash2 (which are generated based on a password, random numbers, i.e., E-S1, E-S2, R-S1, and R-S2, the PKE, and the PKR) by using the $M_3$ and $M_4$ messages, and exchanging R-S1, E-S1, R-S2, and E-S2, which are encrypted using the KeywrapKey, by using the $M_3$ through $M_7$ messages. That is, the station is authenticated using the $M_3$ through $M_7$ messages.

Here, the password is a unique value that the station supporting SimpleConfig has. A user inputs a secret number via a user interface of the registrar, and the registrar authenticates the station using the password.

If the station is authenticated, the registrar encrypts Config data, which is wireless network access information, and transmits the encrypted result to the station by using the $M_8$ message. In this case, Config data contains the PSK, and may further contain Service Set Identifier (SSID), etc.

As described above, when a user desires to allow a station to temporarily access a wireless network that distributes a PSK by using the WFA Simple Config protocol, the registrar must distribute different PSKs to stations that desire to access the wireless network. Also, when the station that is allowed to temporarily access the wireless network discontinues the access, the user must delete a PSK allocated to this station from a list of PSKs of an access point so that the station cannot further access the network.

However, in this case, the user must find out the allocated PSK. If information that identifies the station is made in a format that the user cannot understand, the user may have difficulties in finding out the allocated PSK. Also, if the user does not delete a PSK, which is to be deleted, by mistake, the station can access the network semipermanently.

SUMMARY OF THE INVENTION

The present invention provides an apparatus and method for allowing a guest station, which is specified according to a user input, to temporarily access a wireless network under a WPA-PSK environment.

According to an aspect of the present invention, there is provided a method of managing a station in a wireless network under a WPA-PSK environment, the method comprising determining whether the station is a guest station, and selectively transmitting a session key to the station, depending on the determination result.

The selectively transmitting the session key may comprise transmitting the session key if it is determined that the station is a guest station, and transmitting a shared key if it is determined that the station is not a guest station. The selectively transmitting the session key may comprise transmitting a message containing the session key instead of a shared key if it is determined that the station is a guest station, where the message is defined for distribution of the shared key in the wireless network.

The message may contain information representing that the station is a guest station.

According to another aspect of the present invention, there is provided a computer readable recording medium storing a computer program for performing the method of managing a station.

According to another aspect of the present invention, there is provided an apparatus for managing a station in a wireless network under a WPA-PSK environment, the apparatus comprising a station determination unit which determines whether the station is a guest station; and a transmitting unit which selectively transmits a session key to the station, depending on the determination result.

The message may be an $M_8$ message defined in a WCN-NET standard.

The apparatus may further include a session management unit which stores the session key and an identifier, which identifies the station from among stations accessing the wireless network, in a memory so that they are mapped to each other, and deletes the session key in response to user input; and a user interface which displays that the identifier and the session key are stored.

According to another aspect of the present invention, there is provided a method of allowing a station to obtain a session key in a wireless network under a WPA-PSK environment, the method comprising receiving a message, which is defined for distribution of a shared key in the wireless network, from a registrar; determining whether the message contains information representing that the station is a guest station; and selectively performing 4-way handshaking together with the registrar, based on the determination result.

The selectively performing of the 4-way handshaking may comprise performing the 4-way handshaking together with the registrar so as to obtain the session key if it is determined that the information is not contained in the message, and extracting the session key from the message without performing the 4-way handshaking if it is determined that the information is contained in the message.

According to another aspect of the present invention, there is provided a computer readable recording medium storing a computer program for performing the method of allowing a station to obtain a session key.

According to another aspect of the present invention, there is provided a station apparatus which operates in a wireless network under a WPA-PSK environment, the apparatus comprising a receiving unit which receives a message, which is defined for distribution of a shared key in the wireless network, from a registrar; a message analyzing unit which determines whether the message contains information representing that the station is a guest station; and a session key generation unit which selectively performs 4-way handshaking together with the registrar, based on the determination result.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings.

Figure 4:
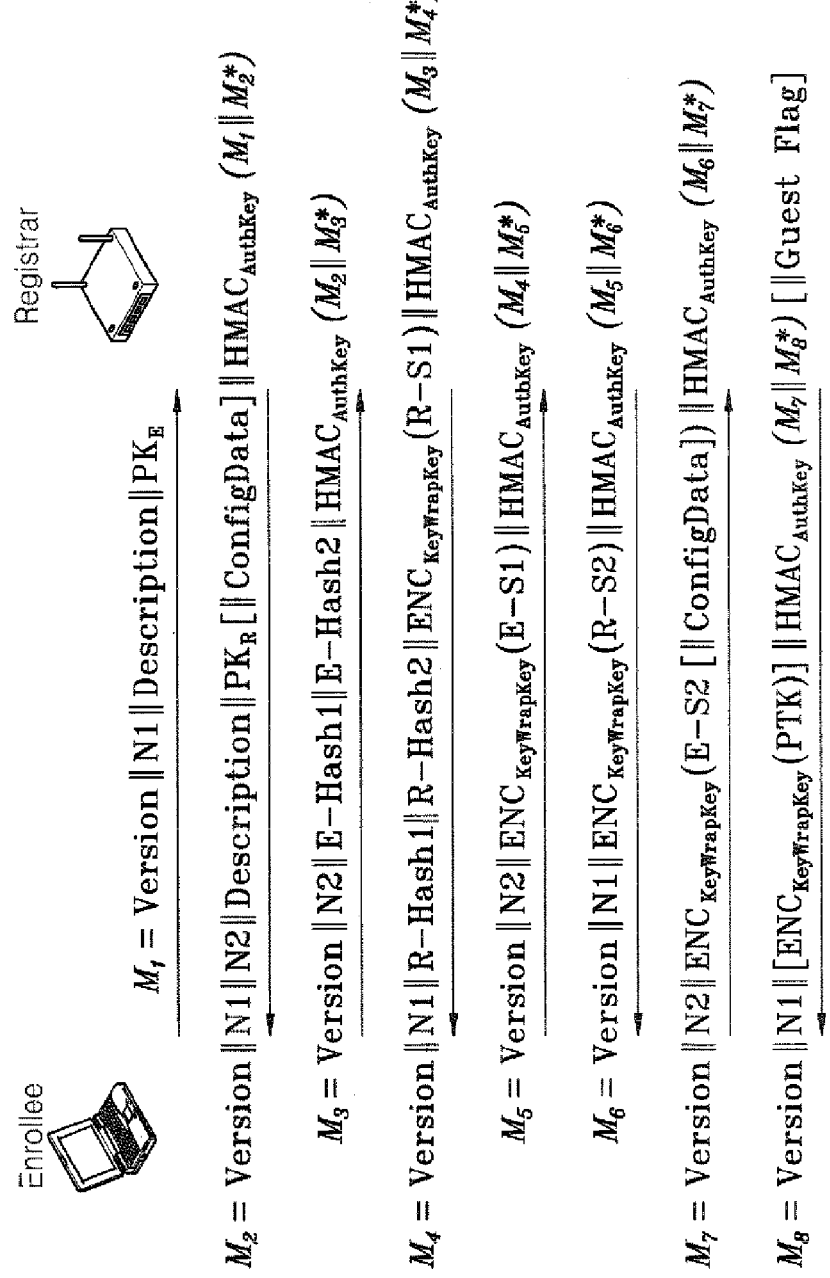
FIG. 4 illustrates a method of allowing a guest station to acquire a session key, according to an exemplary embodiment of the present invention.

FIG. 4 illustrates a method of allowing a guest station to acquire a session key, according to an exemplary embodiment of the present invention. In this disclosure, the guest station denotes a station that receives from a user a permission to temporarily access a network.

A user inputs a password of a station via a user interface of a registrar. In an exemplary embodiment of the present invention, the user interface of the registrar displays a dialog box on its input screen, whereby a user can determine whether a station is to be set as a guest station. That is, the user can permit the station, which desires to access a network, to temporarily access the network, by checking the dialog box for determining the guest station.

Figure 1:
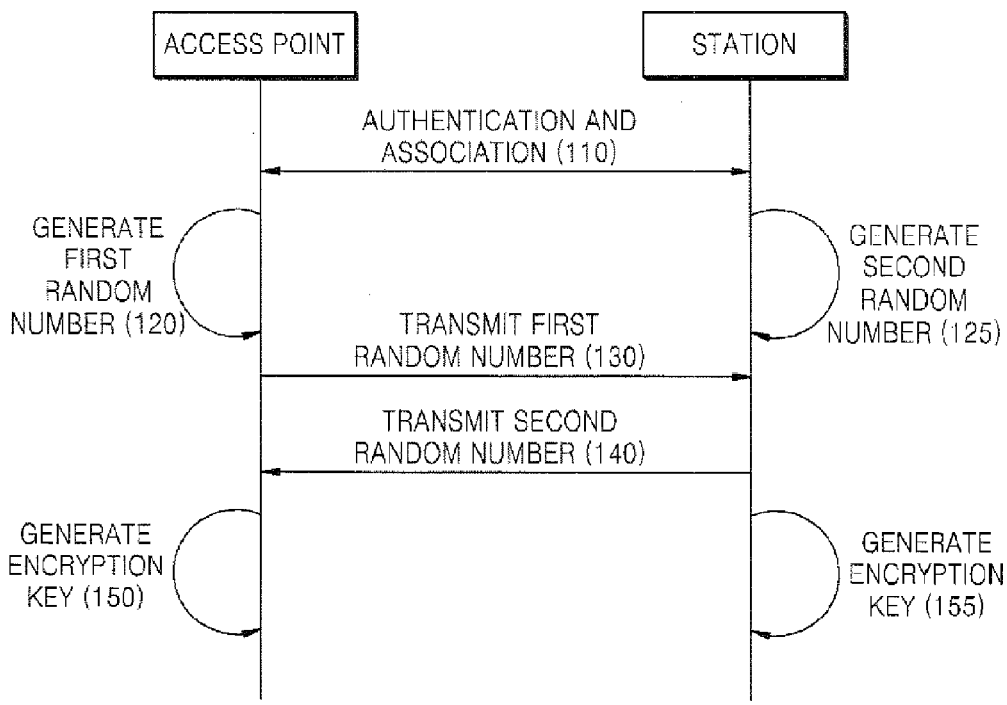
FIG. 1 is a timing diagram illustrating a process of producing a session key in a WPA-PSK network.
Figure 2:
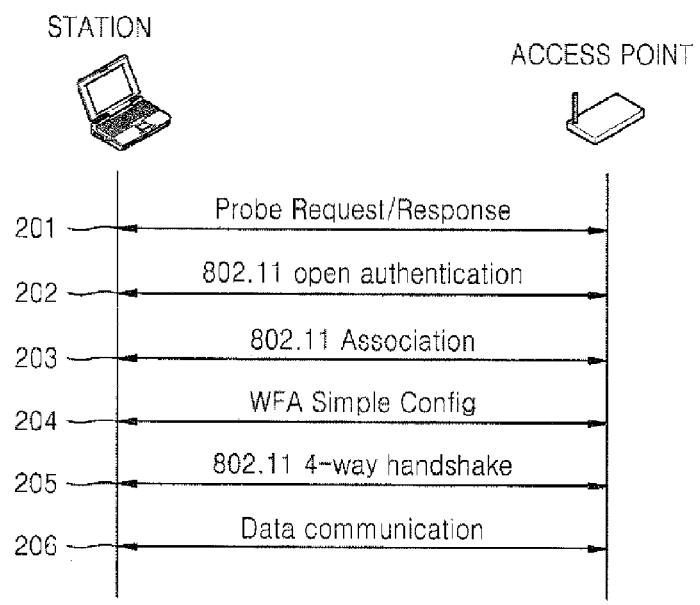
FIG. 2 is a timing diagram illustrating a process of allowing a station to access the WPA-PSK network.
Figure 3:
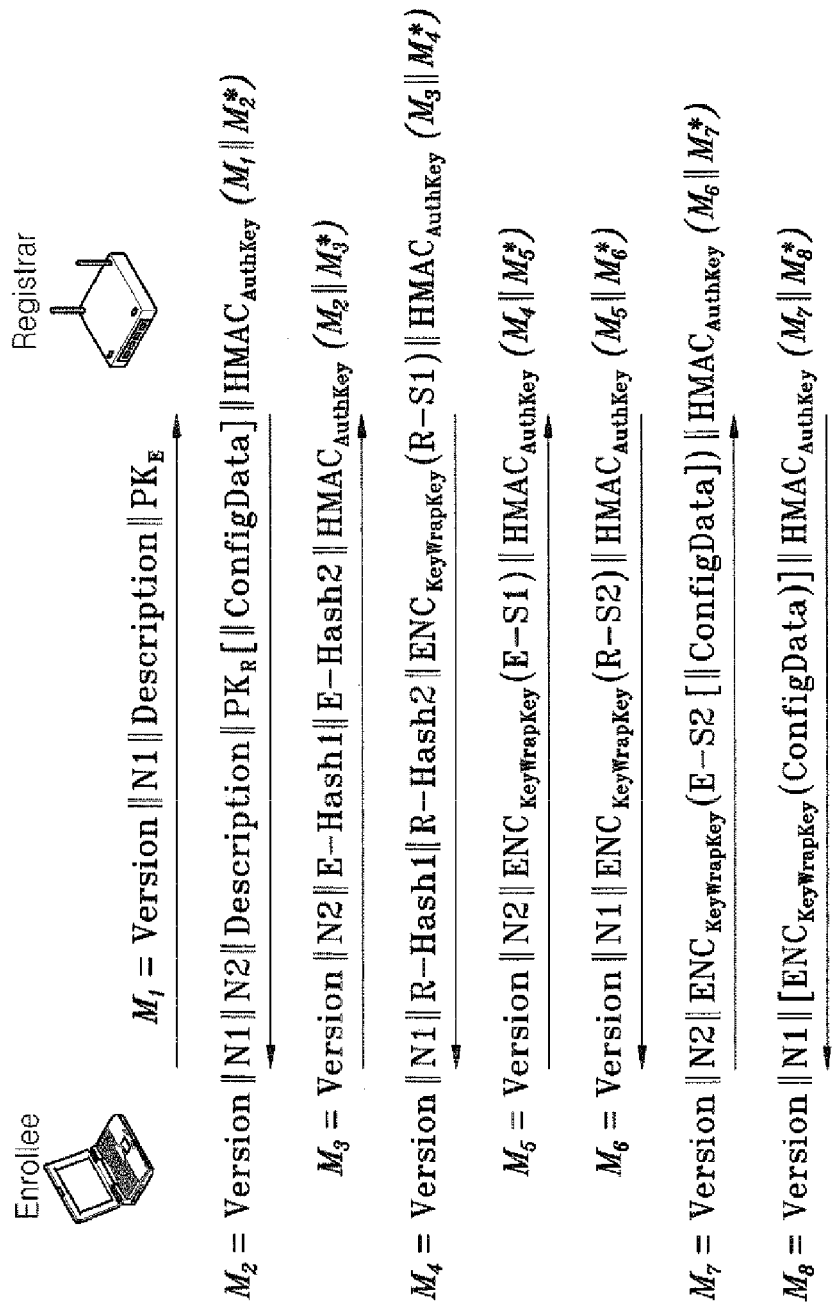
FIG. 3 illustrates a process of establishing a communication between a station and an access point according to a WFA Simple Config protocol.

The processes illustrated in FIG. 4 are almost the same as the process of exchanging messages by using a WFA Simple Config protocol, which has been described above with reference to FIG. 3. Specifically, the station and the registrar share a KeywrapKey, which is used to encrypt and decrypt an AuthKey and a PSK for authenticating other messages, by exchanging $M_1$ and $M_2$ messages. A station is authenticated, that is, whether a new station is a station corresponding to the password that the user inputs is determined, by exchanging $M_3$ through $M_7$ messages.

However, when the user sets a new station as a guest station, if the new station is authenticated, the content of an $M_8$ message is slightly changed as illustrated in FIG. 4. That is, in the case of the related art, the $M_8$ message that contains the PSK which is a shared key is transmitted to the station, but the $M_8$ message that contains a PTK which is a session key is transmitted to the station, according to an exemplary embodiment of the present invention. The type or the name of the session key may be variously determined. That is, the session key is not limited to the PTK. FIG. 4 illustrates only the PTK but network access information, such as SSID, is actually further transmitted to the station.

As described above, the PTK is actually a session key produced through 4-way handshaking by a station and an access point that share a PSK. However, according to an exemplary embodiment of the present invention, the PTK (and not the PSK) is transmitted to a guest station so as to give the guest station a right to temporarily access the network.

Since the access point does not delete the PSK unless instructed otherwise from the user, the station holding the same PSK can produce the PSK and access the network again at any time by performing the 4-way handshaking. However, when a station using the PTK is disconnected from the network, the PTK is deleted. Accordingly, when a guest station given the PTK (and not the PSK) is disconnected from the network and then tries to access the network, the previously given PTK is no more available. Also, the guest station does not have the PSK for generating a new PTK. Therefore, the guest station cannot further establish a communication with the access point.

In an exemplary embodiment of the present invention, the $M_8$ message contains information indicating whether it is related to a guest station. Guest Flag is illustrated as such information in FIG. 4. Thus, a station receiving the $M_8$ message determines whether the $M_8$ message contains Guest Flag, and recognizes a key extracted from the $M_8$ message as the PSK or the PTK, based on the determination result.

Figure 5:
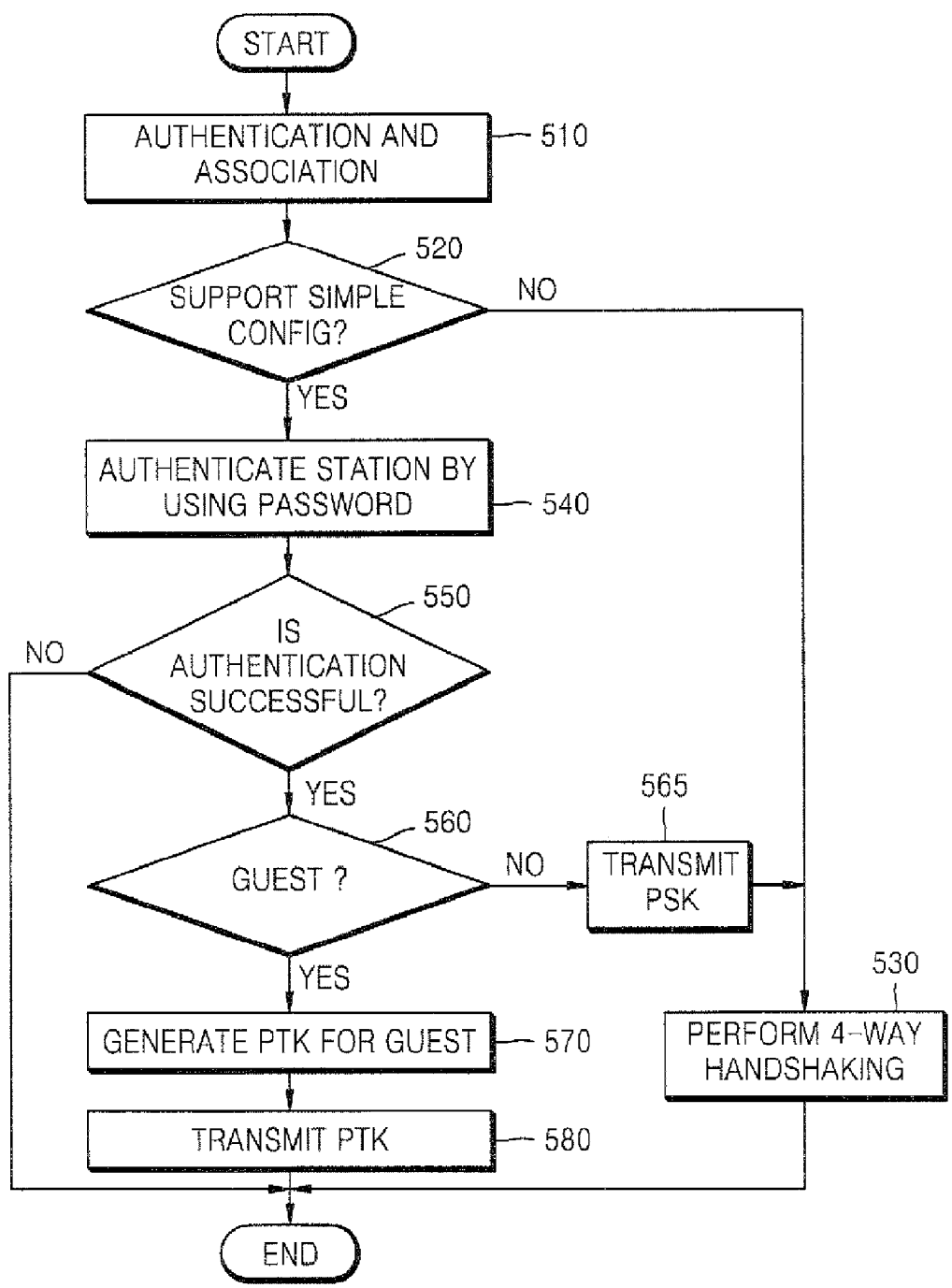
FIG. 5 is a flowchart illustrating a method of managing a station in the WPA-PSK network according to an exemplary embodiment of the present invention.

FIG. 5 is a flowchart illustrating a method of managing a station in a WPA-PSK network according to an exemplary embodiment of the present invention. In this exemplary embodiment, an access point includes a registrar.

In operation 510, a new station performs an authentication process and an association process that are defined in the IEEE 802.11 standard. As described above, even if the station satisfactorily completes the authentication process and the association process, it has yet to enter a state in which a communication can be established with the access point.

In operation 520, the access point determines whether the station supports a WFA Simple Config protocol. It is possible to determine whether the station supports the WFA Simple Config protocol by exchanging a probe request message and a probe response message in operation 510.

If it is determined, in operation 520a that the station does not support the WFA Simple Config protocol, in operation 530, the access point produces a PTK, which is a session key, by performing 4-way handshaking together with the station, since a user has set a PSK in the station.

If the station supports the WFA Simple Config protocol, in operation 540, the access point authenticates the station by using a password of the station that the user inputs.

If the authentication is successful (operation 550), in operation 560, it is determined whether the station is a guest station. As described above, whether a new station is to be set as a guest station is determined based on user input received via a user interface of the access point. If it is determined that the new station is not a guest station, a general WFA Simple Config process is performed. That is, in operation 565, the PSK is transmitted to the station, and in operation 530, 4-way handshaking is performed to produce a PTK.

If it is determined that the new station is a guest station, a PTK for the guest station is produced in operation 570, and transmitted to the station by using an $M_8$ message in operation 580. In this case, the $M_8$ message contains Guest Flag.

Figure 6:
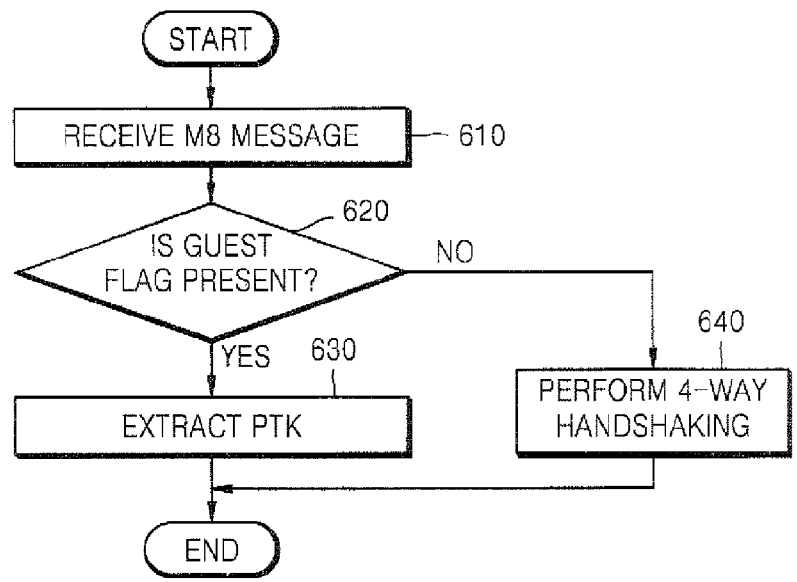
FIG. 6 is a flowchart illustrating a process in which a station in the WPA-PSK network acquires a session key, according to an exemplary embodiment of the present invention.

FIG. 6 is a flowchart illustrating a process in which a station in a WPA-PSK network acquires a session key, according to an exemplary embodiment of the present invention. A description of a process in which the station exchanges $M_1$ through $M_7$ messages by performing a process by using a WFA Simple Config protocol, will be omitted. The station receives an $M_8$ message in operation 610, and analyzes it so as to determine whether this message contains Guest Flag in operation 620.

If the $M_8$ message does not contain Guest Flag, in operation 640, the station produces a PTK by performing 4-way handshaking together with an access point since the $M_8$ message contains a PSK.

If the $M_8$ message contains Guest Flag, in operation 630, the station recognizes that a key contained in the $M_8$ message is a PTK and not a PSK, and extracts the PTK from the $M_8$ message so as to use the PTK in a communication to be established with the access point.

Figure 7:
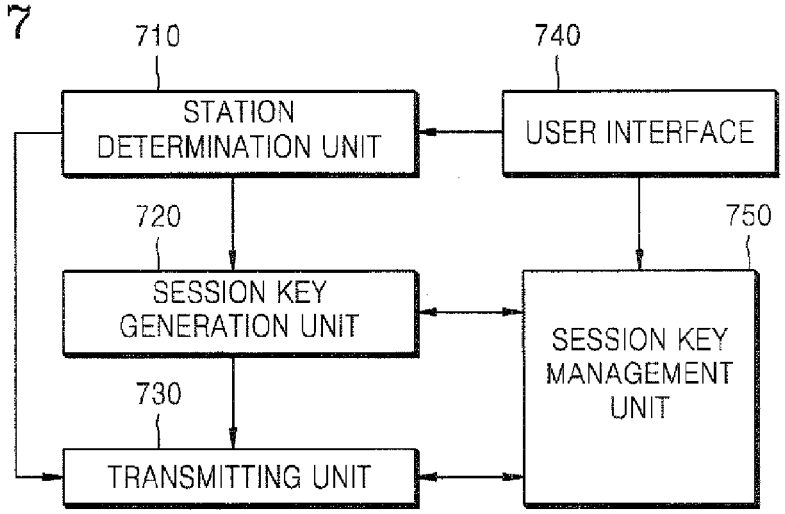
FIG. 7 is a block diagram of a registrar apparatus according to an exemplary embodiment of the present invention.

FIG. 7 is a block diagram of a registrar apparatus according to an exemplary embodiment of the present invention. Referring to FIG. 7, the registrar apparatus includes a station determination unit 710, a session key generation unit 720, a transmitting unit 730, a user interface unit 740, and a session key management unit 750.

The station determination unit 710 determines whether a new station is a guest station based on a value that a user input via the user interface unit 740.

When the station determination unit 710 determines that the new station is a guest station, the session key generation unit 720 generates a session key for the guest station.

The transmitting unit 730 transmits the generated session key to the new station when the new station is a guest station, and transmits a shared key to the new station when the new station is not a guest station. The session key or the shared key is transmitted to the station via an $M_8$ message. In this case, the session key or the shared key is encrypted using a predetermined encryption key, such as a KeywrapKey.

The session key management unit 750 stores the generated session key in a memory (not shown) of an access point so that it is mapped to an identifier of a corresponding station, and deletes the session key when a station using the stored session key discontinues access to a network.

The user interface unit 740 displays the identifier of the station stored in the memory of the access point, together with the session key associated with the station so that the user can manually manage the session key, and input a password of a new station and set the new station as a guest station, as described above.

Figure 8:
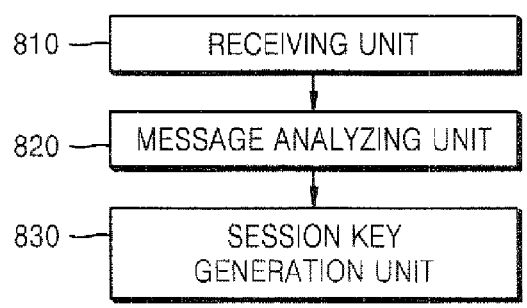
FIG. 8 is a block diagram of a station apparatus according to an exemplary embodiment of the present invention.

FIG. 8 is a block diagram of a station apparatus according to an exemplary embodiment of the present invention. Referring to FIG. 8, the station apparatus includes a receiving unit 810, a message analyzing unit 820, and a session key generation unit 830.

The receiving unit 810 receives a message according to a WFA Simple Config protocol from a registrar (not shown), and the message analyzing unit 820 analyzes an $M_8$ message that the receiving unit 810 receives in order to determine whether the $M_8$ message contains Guest Flag.

The session key generation unit 830 selectively performs 4-way handshaking, depending on the analyzing result of the message analyzing unit 820. That is, when the received $M_8$ message contains Guest Flag, the session key generation unit 830 recognizes that a key contained in the $M_8$ message is a session key and not a shared key, and does not perform the 4-way handshaking. In this case, the station extracts the session key from the $M_8$ message and uses it in a communication to be established with an access point. When the received $M_8$ message does not contain Guest Flag, the session key generation unit 830 recognizes that a key contained in the $M_8$ message is a shared key, and performs the 4-way handshaking in order to produce a session key.

The above exemplary embodiments may be embodied as a computer program, and performed in a general digital computer, which can operate the computer program, via a computer readable recording medium.

Examples of the computer readable recording medium include a magnetic recording medium (a ROM, a floppy disc, a hard disc, etc.), and an optical recording medium (a CD ROM, a DVD, etc.).

As described above, according to an exemplary embodiment of the present invention, a registrar apparatus that uses a WFA Simple Config protocol in a WPA-PSK environment can permit a station to temporarily access a network without allocating different PSKs to stations. Also, even if a user does not manually delete information related to a guest station from an access point, the registrar apparatus can allow the guest station to temporarily access the network.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of allowing a station to obtain a session key in a wireless network under a Wi-Fi Protected Pre-Shared Key (WPA-PSK) environment, the method comprising: receiving a message, which is defined for distribution of a shared key in the wireless network, from a registrar; determining whether the message contains information representing that the station is a guest station; and selectively performing 4-way handshaking together with the registrar, based on the determination result, wherein the selectively performing the 4-way handshaking comprises performing the r-way handshaking together with the registrar so as to obtain the session key if it is determined that the information is not contained in the message, and extracting a session key from the message without performing the 4-way handshaking if it is determined that the information is contained in the message, wherein the message is an $M_8$ message defined in a Windows Connect Now (WCN)-NET standard.

2. A non-transitory computer readable recording medium having embodied thereon a computer program for performing a method of allowing a station to obtain a session key in a wireless network under a Wi-Fi Protected Pre-Shared Key (WPA-PSK) environment, the method comprising: receiving a message, which is defined for distribution of a shared key in the wireless network, from a registrar; determining whether the message contains information representing that the station is a guest station; and selectively performing 4-way handshaking together with the registrar, based on the determination result, wherein the selectively performing the 4-way handshaking comprises performing the r-way handshaking together with the registrar so as to obtain the session key if it is determined that the information is not contained in the message, and extracting a session key from the message without performing the 4-way handshaking if it is determined that the information is contained in the message, wherein the message is an $M_8$ message defined in a Windows Connect Now (WCN)-NET standard.

3. A station apparatus which operates in a wireless network under a Wi-Fi Protected Pre-Shared Key (WPA-PSK) environment, the apparatus comprising: a receiving unit which receives a message, which is defined for distribution of a shared key in the wireless network, from a registrar; a message analyzing unit which determines whether the message contains information representing that the station is a guest station; and session key generation unit which selectively performs 4-way handshaking together with the registrar, based on the determination result, wherein the session key generation unit performs the 4-way handshaking together with the registrar so as to obtain the session key if it is determined that the information is not contained in the message, and extracting a session key from the message if it is determined that the information is contained in the message, wherein the message is an $M_8$ message defined in a Windows Connect Now (WCN)-NET standard.

* * * * *